United States Patent
Liu

(10) Patent No.: US 10,705,787 B2
(45) Date of Patent: *Jul. 7, 2020

(54) METHOD AND APPARATUS FOR DISPLAYING DIGITAL OBJECT IDENTIFIER

(71) Applicant: ALIBABA GROUP HOLDING LIMITED, George Town, Grand Cayman (KY)

(72) Inventor: Yimin Liu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,996

(22) Filed: Jun. 7, 2019

(65) Prior Publication Data

US 2019/0361661 A1     Nov. 28, 2019

Related U.S. Application Data

(63) Continuation of application No. 15/270,990, filed on Sep. 20, 2016, now Pat. No. 10,318,229.

(30) Foreign Application Priority Data

Sep. 21, 2015   (CN) .......................... 2015 1 0604702

(51) Int. Cl.
*G06F 3/14*     (2006.01)
(52) U.S. Cl.
CPC ....... *G06F 3/1454* (2013.01); *G09G 2354/00* (2013.01); *G09G 2370/022* (2013.01); *G09G 2370/027* (2013.01)

(58) Field of Classification Search
CPC .............. G06F 3/1454; G09G 2354/00; G09G 2370/022; G09G 2370/027
See application file for complete search history.

(56) References Cited

U.S. PATENT DOCUMENTS

| | | | |
|---|---|---|---|
| 8,749,452 B2 | 6/2014 | Hosein et al. |
| 9,026,602 B2 | 5/2015 | Morel et al. |
| 9,075,801 B2 | 7/2015 | Eggert |
| 9,185,462 B2 | 11/2015 | Das et al. |
| 9,280,515 B2 | 3/2016 | Gaede et al. |
| 9,449,294 B2 | 9/2016 | Hwang et al. |
| 9,641,570 B2 | 5/2017 | Knodt et al. |
| 2007/0136202 A1 | 6/2007 | Noma et al. |
| 2011/0307610 A1 | 12/2011 | Hayashi |

(Continued)

OTHER PUBLICATIONS

PCT International Search Report and Written Opinion dated Dec. 9, 2016, issued in corresponding International Application No. PCT/US16/52715 (9 pages).

*Primary Examiner* — Peter D McLoone
(74) *Attorney, Agent, or Firm* — Finnegan, Henderson, Farabow, Garrett & Dunner, LLP

(57) ABSTRACT

A method for displaying a digital object identifier (DOI) is provided. The method includes receiving, by a server, a display instruction sent by a first device, wherein the display instruction is sent to the server after the first device receives a scan instruction to scan the DOI; determining a second device associated with the first device; and sending the display instruction to the second device, wherein the second device displays the DOI after receiving the display instruction.

7 Claims, 4 Drawing Sheets

(56) References Cited

U.S. PATENT DOCUMENTS

| | | |
|---|---|---|
| 2012/0188147 A1 | 7/2012 | Hosein et al. |
| 2012/0209749 A1* | 8/2012 | Hammad ............... G06Q 20/20 705/27.1 |
| 2012/0199647 A1 | 9/2012 | Hwang et al. |
| 2013/0175333 A1 | 7/2013 | Gilbert et al. |
| 2013/0218721 A1* | 8/2013 | Borhan ................. G06Q 30/02 705/26.41 |
| 2014/0007211 A1 | 1/2014 | Yang et al. |
| 2014/0090001 A1 | 3/2014 | Das et al. |
| 2014/0203071 A1 | 7/2014 | Eggert |
| 2014/0247196 A1 | 9/2014 | Hosein et al. |
| 2014/0250206 A1 | 9/2014 | Jang et al. |
| 2014/0273820 A1 | 9/2014 | Narayan et al. |
| 2015/0006672 A1 | 1/2015 | Morel et al. |
| 2015/0073907 A1* | 3/2015 | Purves .................... G06F 3/011 705/14.58 |
| 2015/0127835 A1* | 5/2015 | Zwaal ................... H04L 67/142 709/227 |
| 2015/0248394 A1 | 9/2015 | Morel et al. |
| 2015/0248664 A1* | 9/2015 | Makhdumi ............ G06Q 20/20 235/380 |
| 2015/0378587 A1 | 12/2015 | Falaki et al. |
| 2016/0042263 A1* | 2/2016 | Gaddam .......... G06K 19/06037 235/494 |
| 2016/0109954 A1* | 4/2016 | Harris ..................... G06F 3/017 345/156 |
| 2016/0050255 A1 | 7/2016 | Huang et al. |
| 2016/0212613 A1 | 7/2016 | Huang |
| 2017/0124303 A1 | 5/2017 | Baldwin et al. |
| 2017/0230710 A1 | 8/2017 | Cha et al. |
| 2017/0289643 A1 | 10/2017 | Kachkova et al. |
| 2018/0006821 A1* | 1/2018 | Kinagi .................. H04W 12/02 |
| 2019/0156403 A1* | 5/2019 | Yankovich .......... G06Q 30/0643 |

\* cited by examiner

METHOD AND APPARATUS FOR DISPLAYING DIGITAL OBJECT IDENTIFIER

CROSS-REFERENCE TO RELATED APPLICATION

This application is a continuation of U.S. patent application Ser. No. 15/270,990, filed on Sep. 20, 2016, which is based upon and claims priority to Chinese Patent Application No. 201510604702.5, filed on Sep. 21, 2015, both of which are incorporated herein by reference in their entireties.

TECHNICAL FIELD

The present application relates to the field of computer technology and, more particularly, to a method and an apparatus for displaying a digital object identifier.

BACKGROUND

With the development of network technology, various information of network-based service providers may be displayed on a webpage, including texts, a Digital Object Identifier (DOI), an image, and the like. At present, a service provider may provide a DOI on a webpage, e.g., a Quick Response (QR) code, and a user may scan the QR code to connect to the corresponding service by using a mobile terminal.

For example, a delivery service provider may provide a QR code on a webpage to quickly allow users to follow social media account, and a user may enable a scan function in an application of a mobile terminal to scan the QR code. After the mobile terminal finishes scanning the QR code, a follow request webpage may be displayed for the user to follow the social media account, where the user need only tap a "confirm to add" button.

However, since a displayed DOI usually occupies some space on a webpage, the available space for displaying other information on the webpage is limited. The DOI can also disturb the user visually for browsing other information displayed on the webpage. In an alternative method, a DOI may be displayed in a separate webpage. That is, no DOI is displayed on the webpage until a user performs certain operations to turn to another separate webpage that is used to display the DOI. But this method requires a user to perform particular operations to trigger display of the DOI, decreasing the convenience of user operations.

SUMMARY

The present disclosure provides a method for displaying a digital object identifier (DOI). Consistent with some embodiments, the method includes: receiving, by a first device, a scan instruction of a user scan the DOI; and sending a display instruction to a server, wherein the display instruction is forward by the server to a second device associated with the first device for displaying the DOI.

Consistent with some embodiments, this disclosure provides another method for displaying a digital object identifier (DOI). The method includes: receiving, by a server, a display instruction sent by a first device, wherein the display instruction is sent to the server after the first device receives a scan instruction to scan the DOI; determining a second device associated with the first device; and sending the display instruction to the second device, wherein the second device displays the DOI after receiving the display instruction.

Consistent with some embodiments, this disclosure provides another method for displaying a digital object identifier (DOI). The method includes: receiving, by a second device, a display instruction, wherein the display instruction is generated a first device after receiving a scan instruction to scan the DOI, and the display instruction is forwarded to the second device through a server; and acquiring and displaying the DOI corresponding to a current webpage, wherein the DOI is displayed on the second device after receiving the display instruction.

Consistent with some embodiments, this disclosure provides an apparatus for displaying a digital object identifier (DOI). The apparatus includes: a receiving module that receives a scan instruction of a user to scan the DOI; and a sending module that sends a display instruction to a server, wherein the display instruction is forward by the server to a second device associated with the apparatus for displaying the DOI.

Consistent with some embodiments, this disclosure provides another apparatus for displaying a digital object identifier (DOI). The apparatus includes: a receiving module that receives a display instruction sent by a first device, wherein the display instruction is sent to the apparatus after the first device receives a scan instruction to scan the DOI; a determining module that determines a second device associated with the first device; and a sending module that sends the display instruction to the second device, wherein the second device displays the DOI after receiving the display instruction.

Consistent with some embodiments, this disclosure provides another apparatus for displaying a digital object identifier (DOI). The apparatus includes: a receiving module that receives a display instruction, wherein the display instruction is generated a first device after receiving a scan instruction to scan the DOI, and the display instruction is forwarded to the apparatus through a server; and an acquiring module that acquires and displays the DOI corresponding to a current webpage, wherein the DOI is displayed on the apparatus after receiving the display instruction.

Consistent with some embodiments, this disclosure provides a non-transitory computer readable medium that stores a set of instructions that is executable by at least one processor of a server to cause the server to perform a method for displaying a digital object identifier (DOI). The method includes: receiving a display instruction sent by a first device, wherein the display instruction is sent to the server after the first device receives a scan instruction to scan the DOI; determining a second device associated with the first device; and sending the display instruction to the second device, wherein the second device displays the DOI after receiving the display instruction.

Consistent with some embodiments, this disclosure provides a non-transitory computer readable medium that stores a set of instructions that is executable by at least one processor of a first device to cause the first device to perform a method for displaying a digital object identifier (DOI). The method includes: receiving a scan instruction of a user to scan the DOI; and sending a display instruction to a server, wherein the display instruction is forward by the server to a second device associated with the first device for displaying the DOI.

Consistent with some embodiments, this disclosure provides a non-transitory computer readable medium that stores a set of instructions that is executable by at least one processor of a second device to cause the second device to perform a method for displaying a digital object identifier (DOI). The method includes: receiving a display instruction, wherein the display instruction is generated by a first device after receiving a scan instruction to scan the DOI, and the display instruction is forwarded to the second device through a server; and acquiring and displaying the DOI corresponding to a current webpage, wherein the DOI is displayed on the second device after receiving the display instruction.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
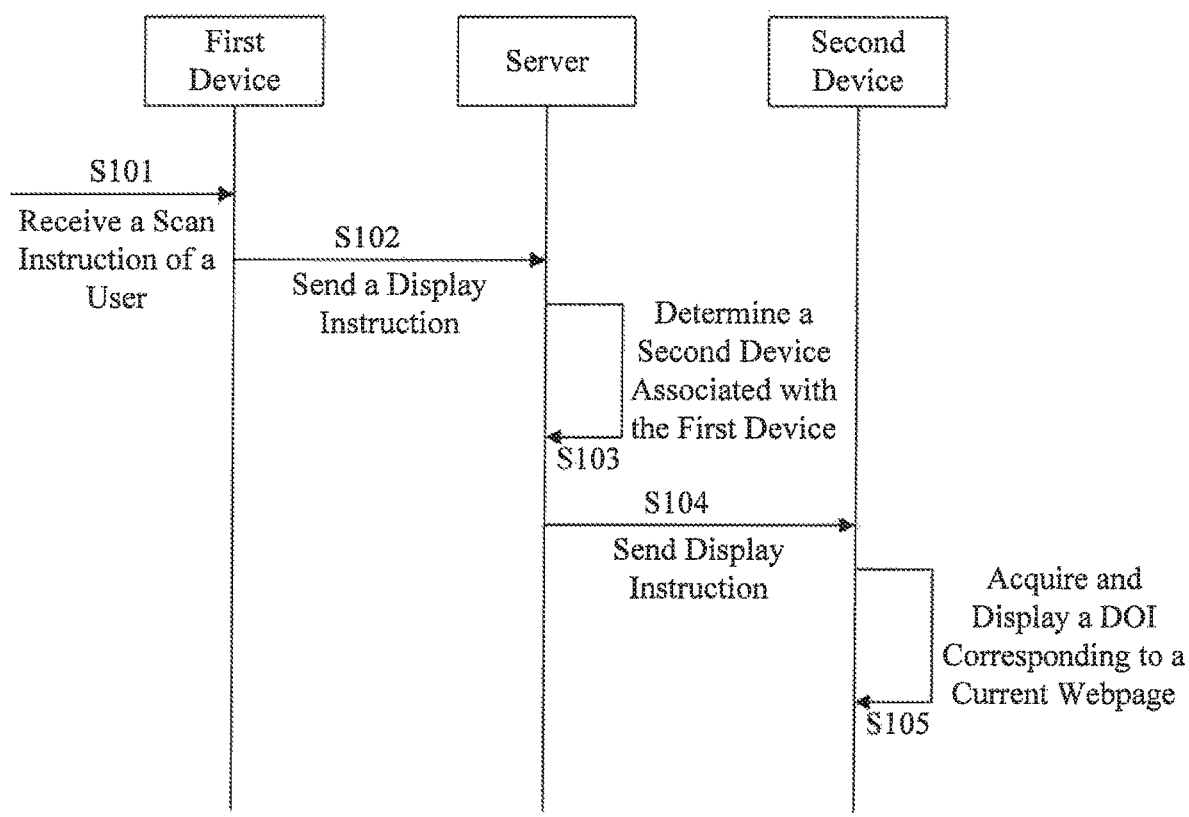
FIG. 1 is a flow diagram of an exemplary method for displaying a DOI, consistent with some embodiments of this disclosure.

FIG. 1 is a flow diagram of an exemplary method 100 for displaying a DOI, consistent with some embodiments of this disclosure. Referring to FIG. 1, the method 100 includes the following steps.

In step S101, a first device receives a scan instruction of a user to scan a DOI. In this disclosure, the DOI may include a one-dimension or two-dimensional barcode used to identify a resource or a service, such as a QR code.

Each resource (e.g., a video or an electronic book) or service corresponds to a unique DOI, and a user can acquire the corresponding product or service by scanning the DOI. For example, a service provider may include DOIs corresponding to certain services or resources in a webpage, such as QR codes, such that a user can conveniently acquire a corresponding service or resource by scanning the DOI on the webpage. The user may enter an instruction to scan the QR code in a first device, such as by tapping a "scan" icon in an instant messaging application in the first device, and correspondingly, the first device may enable a QR code scan function for scanning the QR code.

In practice, a user may browse information on a second device different from the first device, and if interested in information being browsed, the user may use the first device to scan a DOI displayed on the second device, so as to perform further operations. The second device may include any device capable of displaying information, for example, a personal computer (PC) or a tablet computer.

In some embodiments, when initially displaying information, the second device may not display any DOI in order to prevent interference to information displayed on the second device. For example, the user may browse information on a merchant's website using a PC (corresponding to the second device). When the user is interested in a commodity being browsed, the user may scan a QR code corresponding to the commodity by using a mobile phone (corresponding to the first device) to purchase the commodity, such as by tapping a "scan" icon in a payment application installed on the mobile phone. When the commodity information is displayed in the PC, the QR code corresponding to the commodity is not shown, thereby eliminating the disturbance to the user by the QR code.

Since the second device may not display any DOI when initially displaying information in a webpage, the user may not know whether the current webpage has a corresponding DOI when browsing the webpage on the second device. In some embodiments, the second device may display prompt information in the current webpage to notify the user that the webpage has a corresponding DOI and that the user may view the corresponding DOI on the second device by logging in the first device (such as a mobile phone) using the same account and enabling the DOI scan function of the first device. In some embodiments, the prompt information may further include detailed information about a service or resource corresponding to the DOI. For example, in a detailed information page of an online shopping website, a message "this webpage provides a QR code for placing an order on a mobile phone" may be shown.

In step S102, the first device sends a display instruction to a server. Since the second device does not display any DOI in its initially displayed information, once the user enables the DOI scan function of the first device, it indicates that the user has an intention of scanning a DOI. Thus, after receiving the DOI scan instruction entered by the user, the first device sends a display instruction to a server, which then instructs the second device to display the corresponding DOI for the first device to scan. In some embodiments, the display instruction may include an account currently used by the first device.

In step S103, the server receives the display instruction sent by the first device and determines a second device associated with the first device. Generally, the account used by the user when browsing information on the second device is the same as the account used by the user when scanning the DOI using the first device. It may be determined, according to the same account, which second device should be instructed to display the DOI for the user to scan. In some embodiments, the server can determine, according to the account included in the display instruction, a device using the same account as the second device.

For example, when detecting that the user taps the "scan" icon in the payment application and enables the DOI scan function, the mobile phone (corresponding to the first device) may send a display instruction to the server. Assuming that the user browses information on a PC that currently uses the account "nuoweisiji" and the display instruction includes an account currently used by the mobile phone as "nuoweisiji", after receiving the display instruction, the server identifies the account "nuoweisiji" currently used by the mobile phone from the display instruction and determines a PC that currently uses the account "nuoweisiji" among multiple devices connected to the server as the second device.

In some embodiments, the user may use different accounts when browsing information on the second device and when scanning a DOI by using the first device and set these accounts as binding accounts, and the server may determine the second device according to a preset binding relationship between various accounts. For example, the server may first determine an account currently used by the first device based on the received display instruction, determine another associated account according to a stored account binding relationship, and then determine a second device based on the associated account.

In step S104, the server sends the display instruction to the second device. In some implementations, the server may first determine an Internet Protocol (IP) address of the second device, and then send the display instruction to the second device according to the IP address.

In step S105, the second device receives the display instruction, and acquires and displays a DOI corresponding to a current webpage. After receiving the display instruction, the second device indicates that the user has browsed information displayed on the second device and is ready to scan a corresponding DOI. Therefore, display of the DOI at this time does not interfere with information on the webpage browsed by the user. After receiving the display instruction, the second device may acquire and display the DOI corresponding to the current webpage, such that the user may use the first device to scan the DOI.

For example, after the PC on which the user browses the commodity information receives the display instruction, the PC indicates that the user has browsed the commodity information displayed on the current webpage and is ready to scan the DOI. Subsequently, the PC can acquire the DOI corresponding to the webpage currently browsed by the user, such as the QR code corresponding to the commodity information displayed on the current webpage, and display the DOI for the user. At this moment, display of the DOI corresponding to the commodity information does not disturb the user browsing the commodity information. The user can then scan the DOI by using the mobile phone and perform a corresponding payment operation to purchase the commodity.

In some embodiments, the DOI corresponding to the current webpage may be stored in a local storage of the second device or may be stored in the server, and the second device may acquire the DOI from a local storage or from the server. When the DOI is stored in the server, the second device may send a webpage identifier of the current webpage to the server, and receive the DOI corresponding to the webpage identifier from the server. When the DOI is stored locally in the second device in advance, the second device may determine a webpage identifier corresponding to the current webpage, and locally acquire the DOI corresponding to the webpage identifier. In some implementations, the webpage identifier may include, but is not limited to, a Uniform Resource Locator (URL) of the current webpage.

In some embodiments, to save network resources, the second device may first locally search for the DOI corresponding to the webpage identifier according to the webpage identifier of the current webpage. If the DOI corresponding to the webpage identifier is found, the DOI may be displayed directly, or if the DOI corresponding to the webpage identifier is not found, the second device may send the webpage identifies the server and display the DOI corresponding to the current webpage acquired from the server.

In some embodiments, when displaying the DOI, the second device may display the DOI at any position on the current webpage, as long as the displayed DOI is not covered by other information. In other embodiments, when the DOI is displayed, another webpage or window separate from the current webpage may be opened by the second device, and the DOI may be displayed on the separate webpage or window.

In the method 100, the second device does not display the DOI before receiving the display instruction, and displays the DOI code only when the user needs to scan the DOI. In doing so, the DOI does not disturb the user's browsing other information on the webpage. Moreover, the method 100 allows the user to scan the DOI by entering the DOI scan instruction on the first device without performing other redundant operations on the second device, thereby improving the convenience of user operations.

Figure 2:
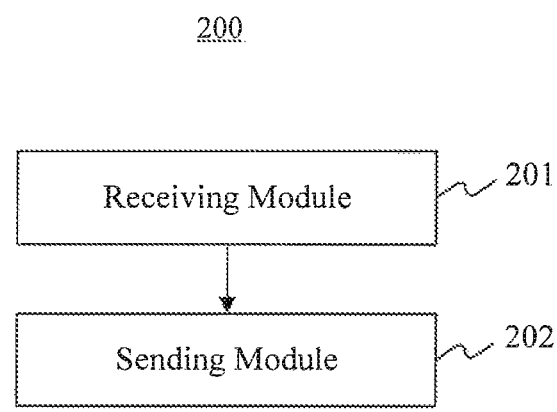
FIG. 2 is a block diagram of an exemplary apparatus for displaying a DOI, consistent with some embodiments of this disclosure.

FIG. 2 is a block diagram of another exemplary apparatus 200 for displaying a DOI, consistent with some embodiments of this disclosure. The apparatus 200 may be implemented as a part or all of a first device described above in connection with FIG. 1, such as a mobile phone or a tablet computer capable of scanning a DOI. Referring to FIG. 2, the apparatus 200 includes a receiving module 201 and a sending module 202.

The receiving module 201 is configured to receive a scan instruction of a user to scan a DOI. For example, the DOI may include a QR code or a barcode.

The sending module 202 is configured to send a display instruction to a server. In response to receiving the display instruction, the server may send the display instruction to a second device associated with the apparatus 200 to instruct the second device to display the DOI, where the second device may use the same user account as the apparatus 200.

Figure 3:
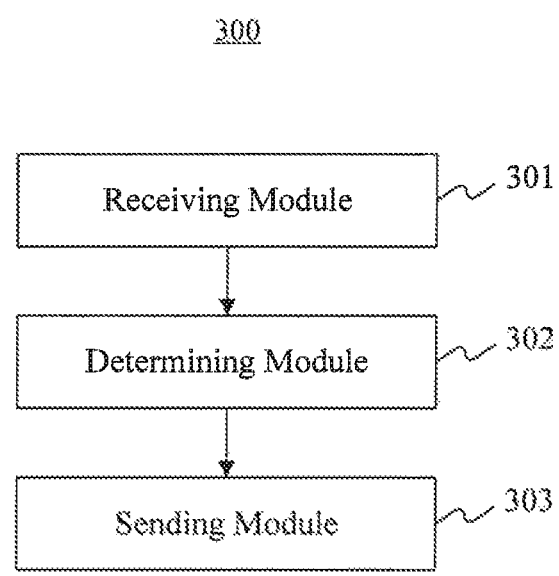
FIG. 3 is a block diagram of another exemplary apparatus for displaying a DOI, consistent with some embodiments of this disclosure.

FIG. 3 is a block diagram of another exemplary apparatus 300 for displaying a DOI, consistent with some embodiments of this disclosure. The apparatus 300 may be implemented as a part or all of a server described above in connection with FIG. 1. Referring to FIG. 3, the apparatus 300 includes a receiving module 301, a determining module 302, and a sending module 303.

The receiving module 301 is configured to receive a display instruction sent by a first device. The display instruction may be sent by the first device after receiving a scan instruction of a user to scan a DOI.

The determining module 302 is configured to determine a second device associated with the first device. In some embodiments, the determining module 302 may be configured to determine an account included in the display instruction sent by the first device and determine a device that uses the same account as the second device associated with the first device.

The sending module 303 is configured to send the display instruction to the second device. The second device may display a DOI after receiving the display instruction, where the DOI is not displayed before receiving the display instruction.

Figure 4:
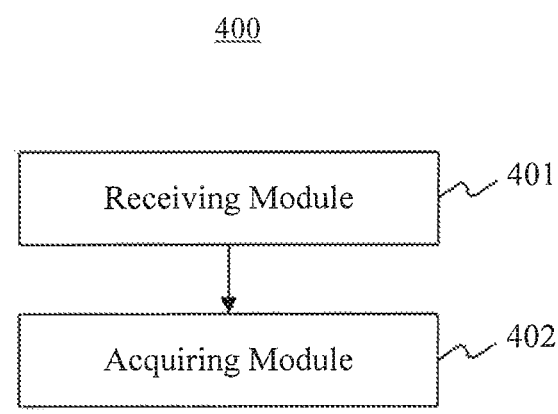
FIG. 4 is a block diagram of another exemplary apparatus for displaying a DOI, consistent with some embodiments of this disclosure.

FIG. 4 is a block diagram of an exemplary apparatus 400 for displaying a DOI, consistent with some embodiments of this disclosure. The apparatus 400 may be implemented as a part or all of a second device described above in connection with FIG. 1, such as a PC or a tablet computer capable of displaying information. Referring to FIG. 4, the apparatus 400 includes a receiving module 401 and an acquiring module 402.

The receiving module 401 is configured to receive a display instruction, where the display instruction is generated by a first device after receiving a scan instruction to scan the DOI, and the display instruction is forwarded to the apparatus 400 through a server.

The acquiring module 402 is configured to acquire and display a DOI corresponding to a current webpage. The DOI is displayed after the receiving module 401 receives the display instruction. In some embodiments, the acquiring module 402 may be configured to send a webpage identifier of the current webpage to the server, and receive a DOI corresponding to the webpage identifier that is returned by the server. In other embodiments, the acquiring module 402 may be configured to determine a webpage identifier of the current webpage and locally acquire a DOI corresponding to the webpage identifier.

In exemplary embodiments, the device or server described above may include a processor, a network interface, an input/output interface, and a memory. The memory may store instructions that when executed by the processor, causing the device or server to perform the above-described methods. The memory may include a tangible and/or non-transitory computer-readable medium, such as a random access memory (RAM), and/or other forms of nonvolatile memory, such as read only memory (ROM) or flash RAM. The non-transitory computer-readable storage medium includes instructions executable by a processor in a device or a server for performing the above-described methods. For example, the non-transitory computer-readable storage medium can include a phase change memory (the PRAM), static random access memory (SRAM), dynamic random access memory (DRAM), other types of random access memory (RAM), electrically erasable programmable read-only memory (EEPROM), flash memory or other memory technology, a cache, a register, CD-ROM, digital versatile disk (DVD), or other optical storage, magnetic cassettes, magnetic tape, or other magnetic disk storage devices, etc.

It should be noted that, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments (e.g., the modules of FIGS. 2-4) can be implemented by hardware, software, or a combination of hardware and software. If implemented by software, it ay be stored in the above-described computer-readable medium. The software, when executed by the processor can perform the disclosed methods. The computing modules and the other functional modules described in this disclosure can be implemented by hardware, or software, or a combination of hardware and software. One of ordinary skill in the art will also understand that multiple ones of the above described modules may be combined as one module, and each of the above described units may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A method for displaying a digital object identifier (DOI), comprising:
   receiving, by a first device, a scan instruction of a user to scan the DOI in the first device; and
   sending, by the first device, a display instruction to a server, wherein the display instruction is forwarded by the server to a second device associated with the first device for displaying the DOI in the second device, and wherein the DOI is displayed in the second device after the scan instruction of the user is received at the first device.

2. The method of claim 1, wherein the second device uses a same account as the first device.

3. The method of claim 1, wherein the DOI comprises a Quick Response (QR) code.

4. A method for displaying a digital object identifier (DOI), comprising:
   receiving, by a server, a display instruction sent by a first device, wherein the display instruction is sent to the server after the first device receives a scan instruction to scan the DOI in the first device;
   determining a second device associated with the first device; and
   sending the display instruction to the second device, wherein the second device displays the DOI after receiving the display instruction.

5. The method of claim 4, wherein determining the second device comprises:
   identifying an account included in the display instruction sent by the first device, wherein the account is an account currently used by the first device; and
   determining a second device currently using the account, wherein the second device is different from the first device.

6. A non-transitory computer readable medium that stores a set of instructions that is executable by at least one processor of a server to cause the server to perform a method for displaying a digital object identifier (DOI), the method comprising:
   receiving, by the server, a display instruction sent by a first device, wherein the display instruction is sent to the server after the first device receives a scan instruction to scan the DOI in the first device;
   determining, by the server, a second device associated with the first device; and
   sending, by the server, the display instruction to the second device, wherein the second device displays the DOI after receiving the display instruction, and wherein the DOI is displayed in the second device after the scan instruction of the user is received at the first device.

7. The non-transitory computer readable medium of claim 6, wherein the set of instructions that is executable by the at least one processor of the server to cause the server to further perform:
    identifying an account included in the display instruction sent by the first device, wherein the account is an account currently used by the first device; and
    determining a second device currently using the account, wherein the second device is different from the first device.

* * * * *